(12) United States Patent
    Falkner

(10) Patent No.: US 9,551,413 B2
(45) Date of Patent: Jan. 24, 2017

(54) LUBRICATED GEAR COUPLING

(71) Applicant: Renold Inc., Westfield, NY (US)

(72) Inventor: Jeffrey Alan Falkner, Chippenham (GB)

(73) Assignee: Renold PLC, Manchester (GB)

( * ) Notice: Subject to any disclaimer, the term of this patent is extended or adjusted under 35 U.S.C. 154(b) by 0 days.

(21) Appl. No.: 14/496,664

(22) Filed: Sep. 25, 2014

(65) Prior Publication Data

US 2016/0091081 A1    Mar. 31, 2016

(51) Int. Cl.
*F16D 3/18* (2006.01)
*F16H 57/04* (2010.01)

(52) U.S. Cl.
CPC ........... *F16H 57/0427* (2013.01); *F16D 3/185* (2013.01)

(58) Field of Classification Search
CPC .............................. F16H 57/0427; F16D 3/185
USPC ........................... 464/16, 154, 156, 158, 159
See application file for complete search history.

(56) References Cited

U.S. PATENT DOCUMENTS

| | | | |
|---|---|---|---|
| 2,592,309 A | 10/1949 | Meier | |
| 3,279,216 A | 10/1966 | Spaulding, Jr. | |
| 3,343,376 A | 9/1967 | Carman | |
| 3,368,369 A | 2/1968 | Kimmel | |
| 3,530,685 A | 9/1970 | Ehret | |
| 3,638,453 A | 2/1972 | Ehret | |
| 3,651,662 A * | 3/1972 | Hoffman | F16D 3/185 464/154 |
| 3,953,986 A | 5/1976 | Calistrat | |
| 4,019,344 A * | 4/1977 | Calistrat | F16D 3/185 464/154 |
| 4,156,531 A | 5/1979 | Boucquey | |
| 4,187,940 A | 2/1980 | Ratliff et al. | |
| 4,650,441 A * | 3/1987 | Lepson | F16D 3/185 464/154 |
| 5,911,630 A | 6/1999 | Shigeura | |
| 6,171,197 B1 | 1/2001 | Boucquey | |
| 6,283,869 B1 | 9/2001 | Spensberger | |
| 6,524,191 B1 | 2/2003 | Tennies | |
| 7,771,281 B2 | 8/2010 | Terasawa et al. | |
| 2009/0238029 A1 | 9/2009 | Naoi et al. | |

(Continued)

FOREIGN PATENT DOCUMENTS

| | | |
|---|---|---|
| EP | 2492530 B1 | 5/2014 |
| GB | 972607 | 10/1964 |

(Continued)

*Primary Examiner* — Gregory Binda
(74) *Attorney, Agent, or Firm* — Simpson & Simpson, PLLC

(57) ABSTRACT

A lubricated gear coupling for transmitting torque between an input shaft and an output shaft, comprising a first hub connected to the input shaft, the first hub comprising at least one gear tooth and a first raised edge, a second hub non-rotatably connected to the output shaft, the second hub comprising at least one gear tooth and a second raised edge, a sleeve gear comprising at least one gear tooth, wherein the first hub and the second hub are arranged within the sleeve gear, the gear tooth of the first hub and second hub corresponding with the gear tooth of the sleeve gear, wherein torque is transmitted from the input shaft to the output shaft with axial, radial, and angular movement occurring between the first hub and the second hub and, a draining means arranged on the sleeve gear, wherein the lubricant can flow through.

35 Claims, 7 Drawing Sheets

(56) References Cited

U.S. PATENT DOCUMENTS

2011/0012314 A1    1/2011  Nakamura

FOREIGN PATENT DOCUMENTS

GB          1394179        5/1975
SU           398780    *   9/1973

* cited by examiner

LUBRICATED GEAR COUPLING

FIELD OF THE INVENTION

The invention relates generally to a gear coupling, and more specifically to an oil lubricated gear coupling.

BACKGROUND OF THE INVENTION

Couplings are used to transmit torque and rotational movement between two machines, where the input and output shafts are misaligned axially, radially, angularly, or a combination of the aforementioned. Different types of couplings have different characteristics and are used in different applications.

Gear couplings have high torque, high misalignment, and moderate speed capability with high torsional stiffness. Gear couplings are usually lubricated by grease, which tends to remain in a cylindrical shape around the outside of the sleeve gear away from the sealing devices. Grease lubricated gear couplings with low misalignment may use contact seals outboard of the gear teeth, while high misalignment couplings may have lips on the end plates extending under the hub gear teeth. However, it is sometimes advantageous to use a lubricant that has low viscosity such as oil where it is difficult or expensive to dismantle the associated machines, to enable the lubricant to be replaced by draining and refilling the coupling using suitable plugs. However, the use of a low viscous lubricant creates sealing problems, in particular, where the couplings are subject to frequent starting and stopping applications.

One embodiment of a lubricated gear coupling is disclosed in U.S. Pat. No. 6,171,197 (Boucquey) which discloses a coupling that allows angular and radial misalignment as well as axial displacement between two shafts. The coupling comprises two hubs, a sleeve tube, stop means to prevent excessive displacement, and sealing rings. Boucquey fails to disclose or teach, however, a lubricated gear coupling with plugs that can be removed and replaced in order to drain and fill lubricant. Boucquey also fails to disclose a channel between sealing rings which aids in preventing any contaminant from entering the chamber containing the lubricant. Instead, Boucquey teaches a lubricated gear coupling with a sealing ring that experiences negligible radial displacement when misalignment occurs and is the sole means for preventing any contamination of the lubricant.

Another embodiment of a lubricated gear coupling is disclosed in U.S. Pat. No. 6,524,191 (Tennies) which discloses an inverted coupling for transmitting power between the shafts of an electric motor and a gear box pinion. The coupling has a shaft hub mounted on the motor shaft, a gearbox hub mounted on the gearbox shaft, annular splines, sleeve ring gears, and a coupling member sleeve seal. Tennies fails to disclose or teach, however, a separate contaminant excluding seal in addition to the lubricant retaining seal. Tennies also fails to disclose a channel between sealing rings which aids in preventing any contaminant from entering the chamber containing the lubricant.

Yet another embodiment of a lubricated gear coupling is disclosed in United States Application Publication No. 2011/0012314 (Nakamura) which discloses an apparatus having a first member, a second member, a first sealing body, and a second sealing body. The lubricant is sealed between the first member and the second member by the first sealing body. The second sealing body is disposed adjacent to the first sealing body opposite the lubricant and slides from a reserve position to a sealing position in the event that the first sealing body is compromised. Each sealing body includes an oil seal and a dust seal. Nakamura fails to disclose or teach, however, a lubricated gear coupling that has individual seals for retaining lubricant and excluding contaminant. Additionally, Nakamura fails to disclose plugs that can be removed and replaced in order to drain and fill the lubricant. Instead, Nakamura teaches a sealing body that has the second sealing body in a reserve position and only functions as a seal when moved into a sealing position after the first sealing body has become compromised.

Thus, there exists a long felt need for a lubricated gear coupling that contains two separate seals for retaining lubricant and excluding contaminant from the lubricant, a means for easily draining the lubricant without completely dismantling the gear coupling, and having features within the gear coupling to minimize the amount of lubricant that migrates towards the lubricant seal.

BRIEF SUMMARY OF THE INVENTION

The present invention broadly includes a lubricated gear coupling for transmitting torque between an input shaft and an output shaft, comprising a first hub connected to the input shaft, the first hub comprising at least one gear tooth and a first raised edge, a second hub non-rotatably connected to the output shaft, the second hub comprising at least one gear tooth and a second raised edge, a sleeve gear comprising at least one gear tooth, wherein the first hub and the second hub are arranged within the sleeve gear, the gear tooth of the first hub and second hub corresponding with the gear tooth of the sleeve gear, wherein torque is transmitted from the input shaft to the output shaft with axial, radial, and angular movement occurring between the first hub and second hub, and a draining means arranged on the sleeve gear, wherein the lubricant can flow through.

The invention also comprises a first, second, third, and fourth seal, wherein the first seal and the second seal are operatively arranged between the first hub and the sleeve gear, the first seal preventing discharge of the lubricant, the second seal preventing contamination of the lubricant. The third seal and the fourth seal are operatively arranged between the second hub and the sleeve gear, the third seal preventing discharge of the lubricant, and the fourth seal preventing contamination of the lubricant.

A general object of the invention is to provide a lubricated gear coupling which performs the same function as prior gear couplings but minimizes the contamination or discharge of the lubricant.

A further object of the invention is to provide a cost savings for the maintenance and lubricant replacement of a lubricated gear coupling.

These and other objects, features and advantages of the present invention will become readily apparent upon a reading and review of the following detailed description of the invention, in view of the appended drawings and claims.

BRIEF DESCRIPTION OF THE DRAWINGS

The nature and mode of operation of the present invention will now be more fully described in the following detailed description of the invention taken with the accompanying figures, in which.

DETAILED DESCRIPTION OF THE INVENTION

At the outset, it should be appreciated that like drawing numbers on different drawing views identify identical, or functionally similar, structural elements of the invention. It is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention as claimed.

Unless defined otherwise, all technical and scientific terms used herein have the same meaning as commonly understood to one of ordinary skill in the art to which this invention pertains. It should be understood that any methods, devices or materials similar or equivalent to those described herein can be used in the practice or testing of the invention.

Figure 1:
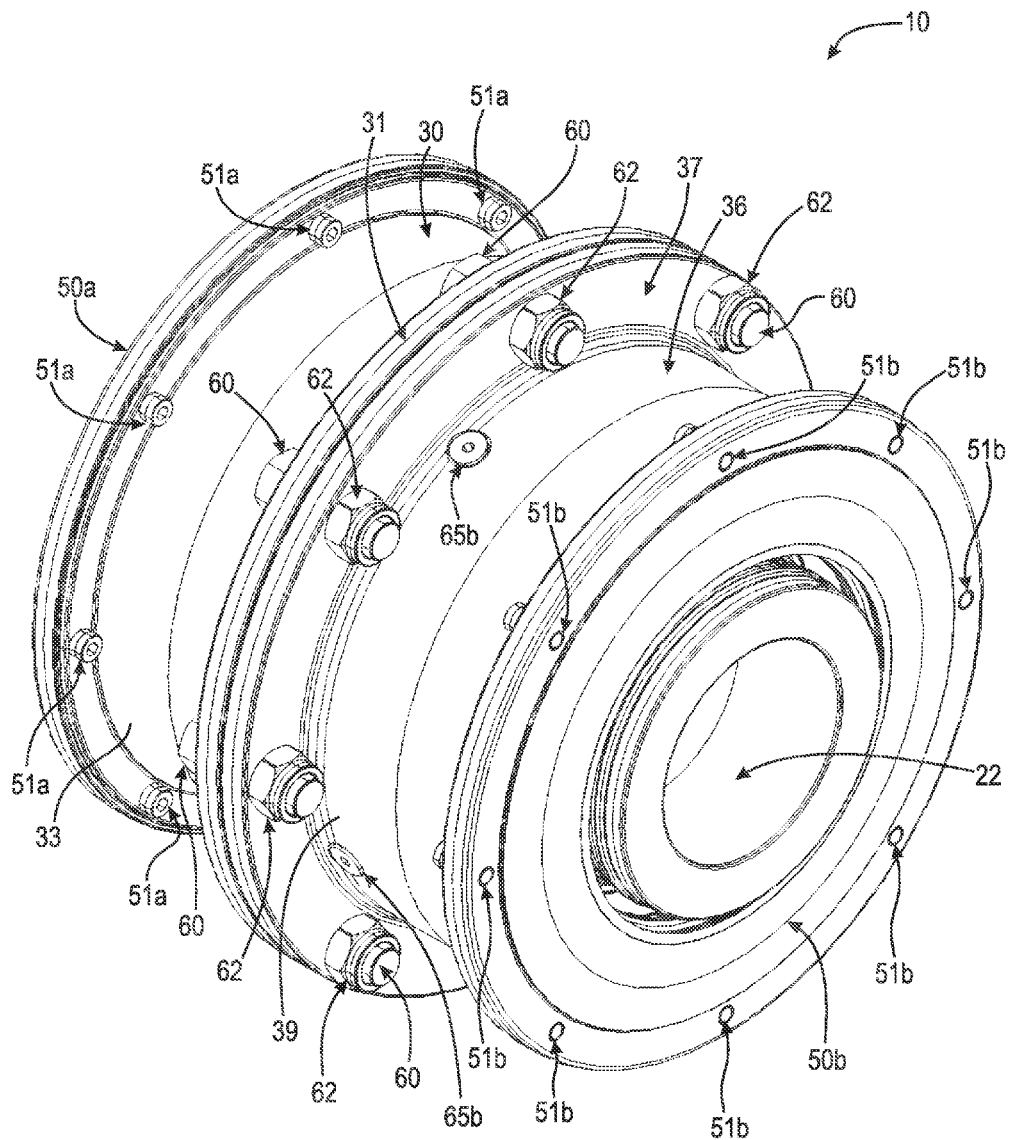
FIG. 1 is a perspective view of the gear coupling of the present invention.

Adverting now to the figures, FIG. 1 is a perspective view of gear coupling 10 which broadly comprises input hub 12 (shown in FIG. 2), output hub 22, first sleeve gear 30, second sleeve gear 36, first end plate 50a, second end plate 50b, bolts 60, nuts 62, drain plugs 65a (shown in FIG. 4), and drain plugs 65b. Input hub 12 and output hub 22 are arranged within first sleeve gear 30 and second sleeve gear 36, respectively. First sleeve gear 30 and second sleeve gear 36 are secured to one another by bolts 60 and nuts 62 which are operatively arranged on flange 31 of first sleeve gear 30 and flange 37 of second sleeve gear 36. First end plate 50a is secured to first sleeve gear 30 by retaining screws 51a. Additionally, second end plate 50b is secured to second sleeve gear 36 by retaining screws 51b. Lubricant 72 (shown in FIG. 7) is enclosed within first sleeve gear 30 and second sleeve gear 36 which reduces friction between input hub 12 and first sleeve gear 30 and between output hub 22 and second sleeve gear 36 while in operation (shown in FIG. 7). Drain plugs 65a (shown in FIG. 4) are operatively arranged on exterior surface 33 of first sleeve gear 30 to allow for the removal and replacement of lubricant 72 within first sleeve gear 30. Additionally, drain plugs 65b are operatively arranged on exterior surface 39 of second sleeve gear 36 to allow for the removal and replacement of lubricant 72 within second sleeve gear 36. This allows a user to perform regular maintenance on gear coupling 10 without completely dismantling gear coupling 10. In a preferred embodiment, drain plugs 65a and 65b are screws which engage and secure with threaded inserts on exterior surfaces 33 and 39 of first sleeve gear 30 and second sleeve gear 36. It should be appreciated, however, that the use of different types of removable plugs is possible and considered to be within the scope of the invention as claimed.

Figure 2:
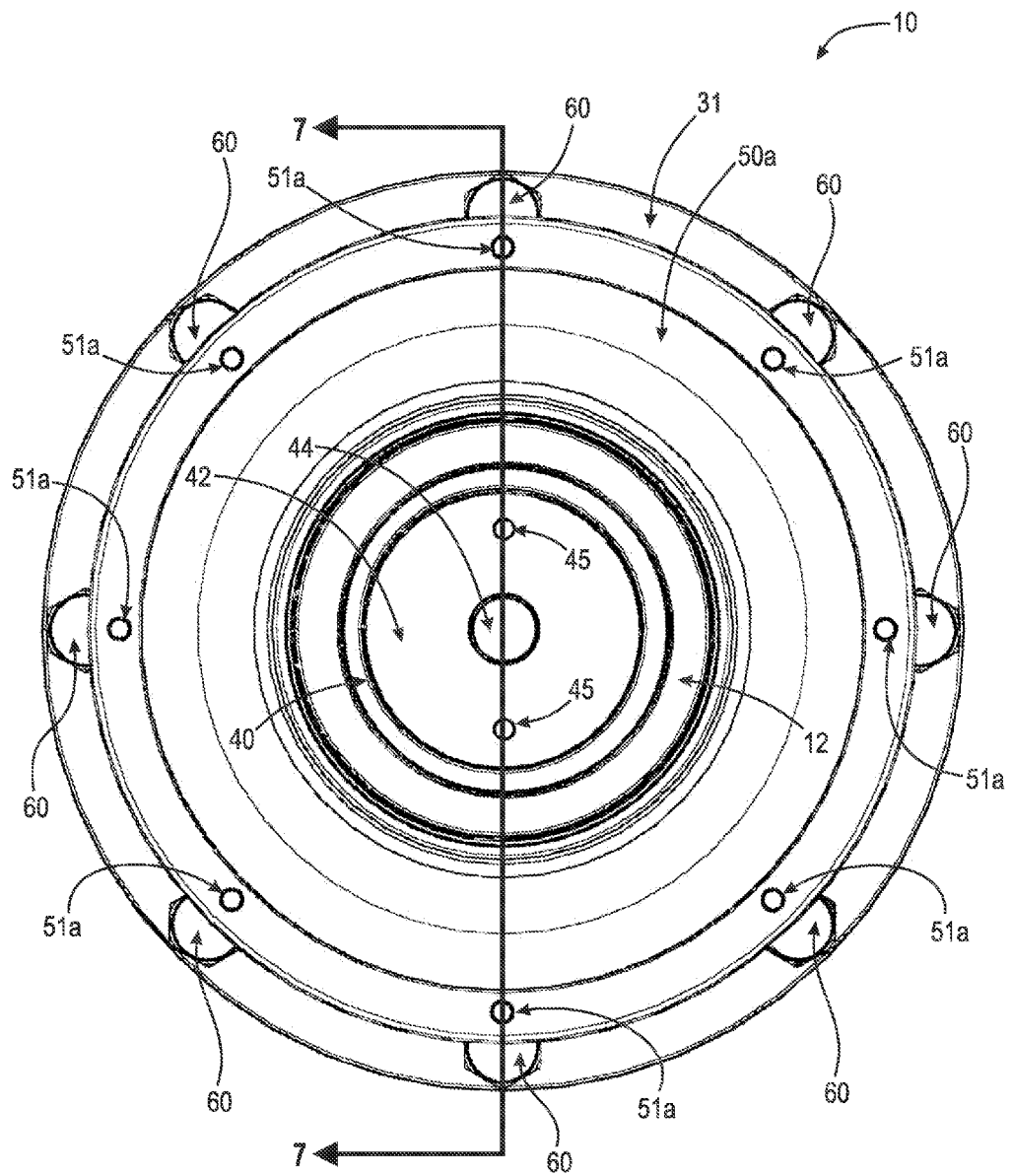
FIG. 2 is a front view of the gear coupling.
Figure 3:
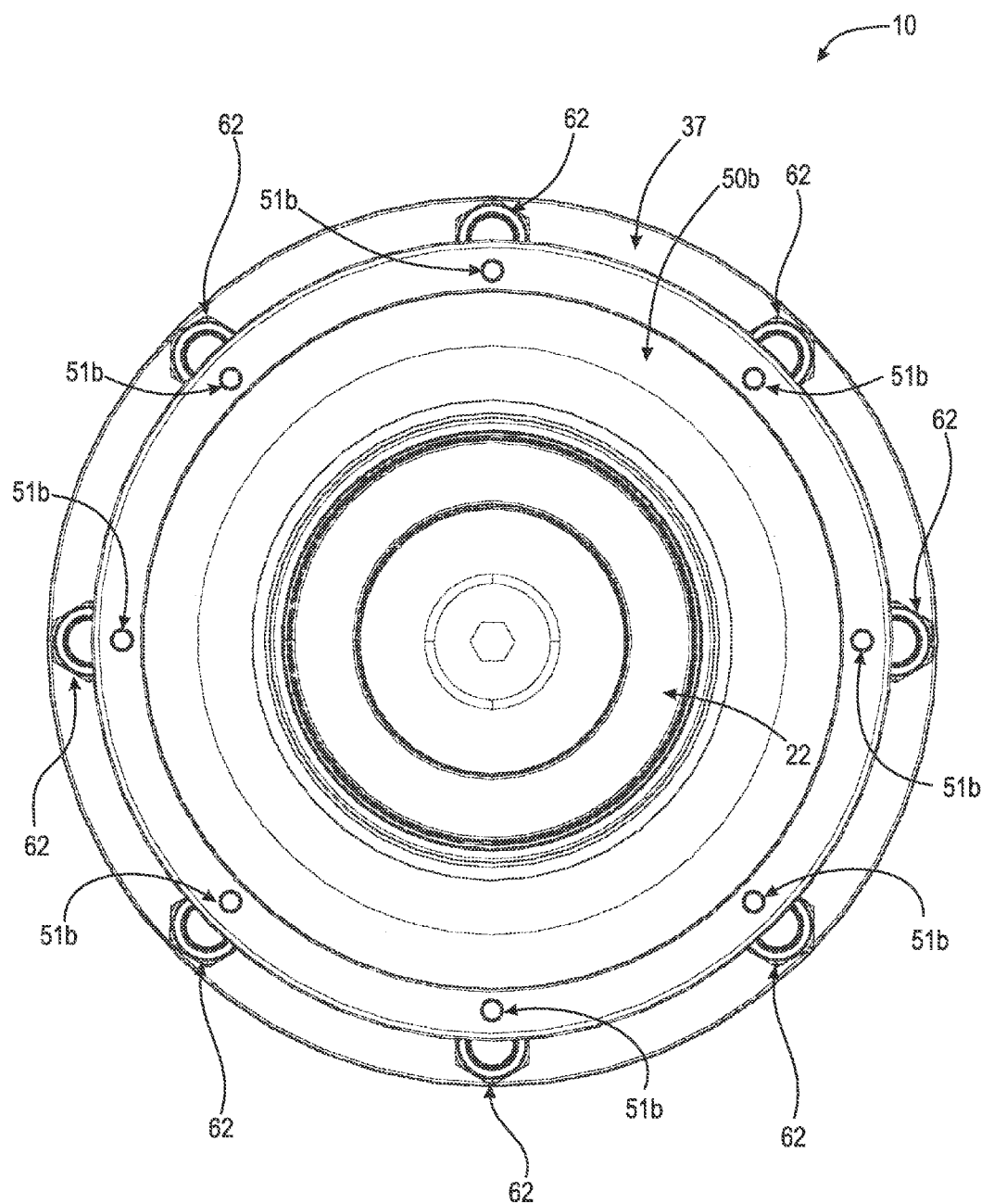
FIG. 3 is a back view of the gear coupling.

FIG. 2 and FIG. 3 are a front and back view of gear coupling 10, respectively. As shown in the figures, retaining plate 42 is concentrically arranged within input hub 12. Retaining plate fastener 44 and pins 45 are operatively arranged on retaining plate 42, which would engage an input means such as a shaft (not shown) to rotate gear coupling 10. An input means (not shown) would also engage sleeve 40, which is concentrically arranged within input hub 12, in order to limit the torque applied to gear coupling 10. In a preferred embodiment, retaining screws 51a and 51b are arranged symmetrically on the face of first end plate 50a and second end plate 50b, respectively. Additionally, screws 60 and nuts 62 are symmetrically arranged on flanges 31 and 37 of first sleeve gear 30 and second sleeve gear 36. It should be appreciated, however, that different asymmetrical arrangements are possible and considered to be within the scope of the invention as claimed.

Figure 4:
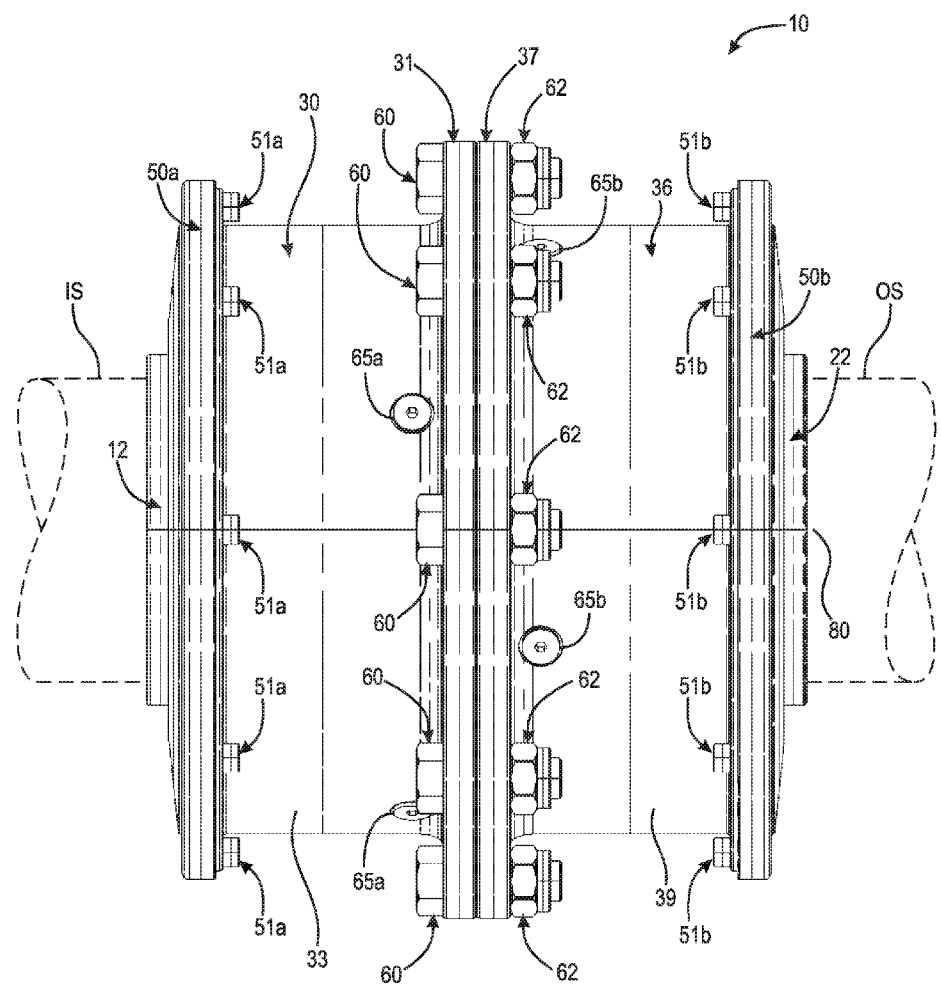
FIG. 4 is a side view of the gear coupling.

FIG. 4 is a side view of gear coupling 10. As shown in the figure, input hub 12 is co-linear with output hub 22 and first sleeve gear 30 is co-linear with second sleeve gear 36. Input hub 12, output hub 22, first sleeve gear 30, and second sleeve gear 36 all rotate about axis 80 while gear coupling 10 is in operation and no misalignment occurs. It is important to note that input hub 12 and output hub 22 can be misaligned axially, radially, and angularly. Also shown in the figure is the symmetrical arrangement of drain plugs 65a on exterior surface 33 of first sleeve gear 30 and the symmetrical arrangement of drain plugs 65b on exterior surface 39 of second sleeve gear 36. It is also shown that input shaft IS and output shaft OS are secured within input hub 12 and output hub 22, respectively. In a preferred embodiment, input hub 12 is secured to input shaft IS via an interference fit and output hub 22 is secured to output shaft OS via an interference fit.

Figure 5:
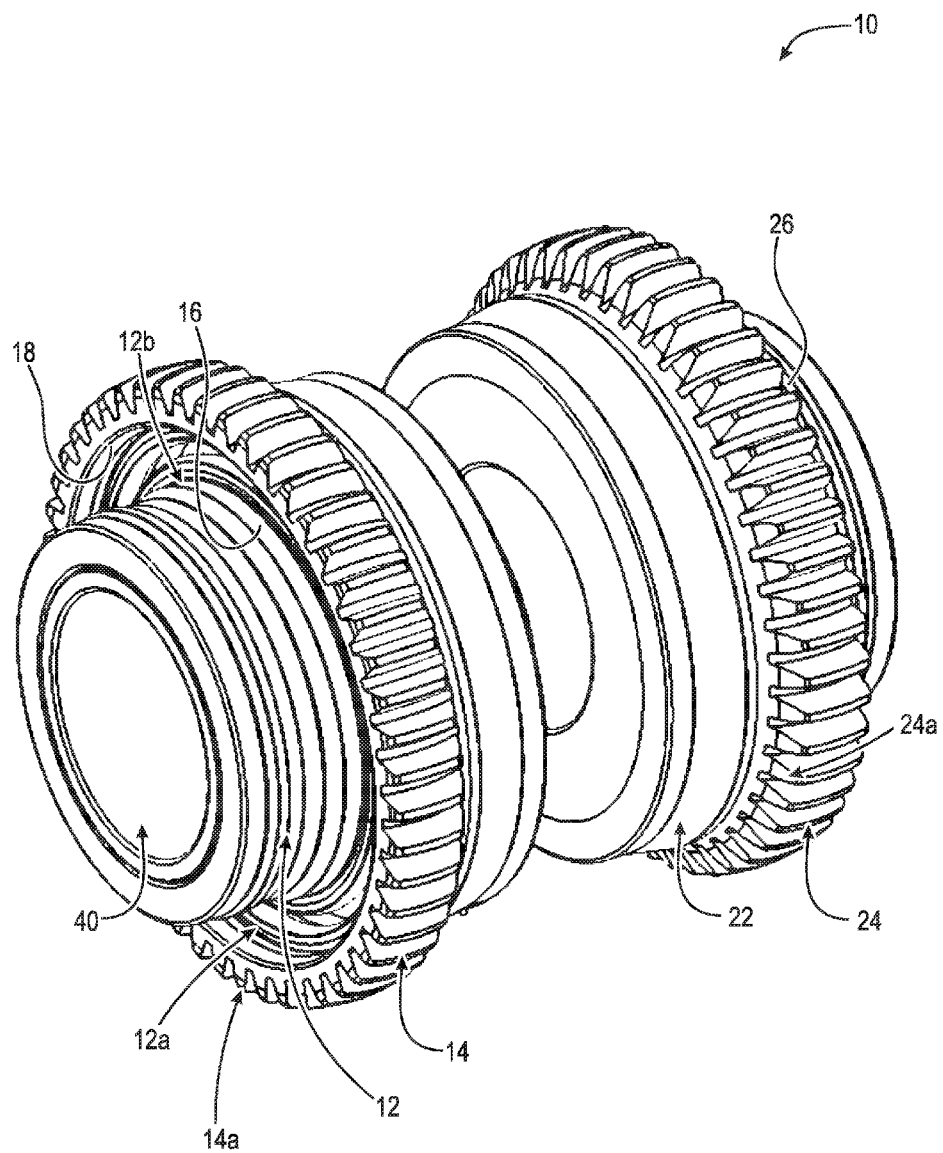
FIG. 5 is a perspective view of input hub 12 and output hub 22.

FIG. 5 is a perspective view of input hub 12 and output hub 22. Input hub 12 comprises gear teeth 14, first surface 16, second surface 18, and sleeve 40. Output hub 22 comprises gear teeth 24, first surface 26, and second surface 28 (shown in FIG. 7). In a preferred embodiment, input hub 12 and output hub 22 are manufactured from a high strength material such as steel. It should be appreciated, however, that the use of different materials is possible and considered to be within the scope of the invention as claimed. For example, input hub 12 and output hub 22 could be manufactured from a composite material if the operating environment is corrosive to steel or a ductile iron if stresses are within an acceptable range. Additionally, gear teeth 14 and gear teeth 24 comprise a spherical crown at the outer most edge of each gear tooth and axially tapered flank 14a and 24a, respectively, to permit angular misalignment.

Figure 6:
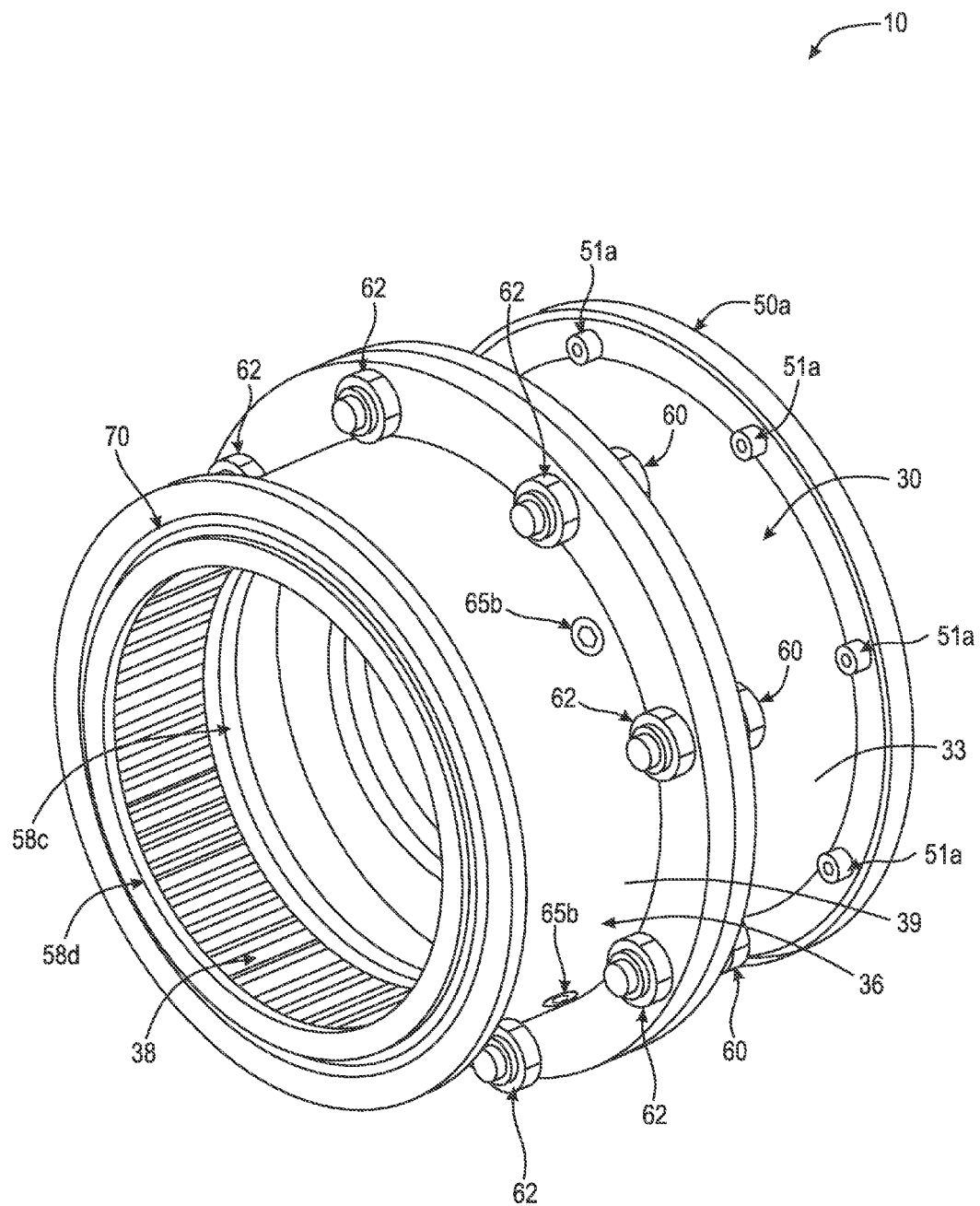
FIG. 6 is a perspective view of the gear coupling with second end plate 50b removed; and, FIG. 7 is a cross sectional view of the gear coupling, taken generally along line 7-7 in FIG. 2.

FIG. 6 is a perspective view of gear coupling 10 with second end plate 50b removed from second sleeve gear 36. As shown in the figure, gear teeth 38 are concentrically arranged within sleeve gear 36. Output hub 22 is substantially non-rotatable with respect to second sleeve gear 36 via gear teeth 38 engaging with gear teeth 24 of output hub 22 (shown in FIG. 7). Gear teeth 38 and gear teeth 24 are designed to allow for axial, radial, or angular misalignment of input hub 12 and output hub 22. Additionally, gear teeth 14 of input hub 12 and gear teeth 32 of first sleeve gear 30 are designed to allow for axial, radial, or angular misalignment of input hub 12 and output hub 22. In order to ensure that output hub 22 stays engaged with sleeve gear 36 via gear teeth 24 and gear teeth 38 while misalignment occurs, bump stops 58c and 58d are concentrically arranged within second sleeve gear 36 at the sides of gear teeth 38. In a preferred embodiment, bump stops 58a, 58b, 58c, and 58d are manufactured from rubber seals. It should be appreciated, however, that any suitable material could be used such as plastic or metal. As misalignment between input hub 12 and output hub 22 occurs while gear coupling 10 is in operation, output hub 22 slides axially, radially, and angularly within second sleeve gear 36 along gear teeth 38 and gear teeth 24 to ensure that there is no excessive torque or stress on gear coupling 10. Additionally, input hub 12 slides axially, radially, and angularly within first sleeve gear 30 along gear teeth 32 and gear teeth 14 due to misalignment of input hub 12 and output hub 22 while gear coupling 10 is in operation (shown in FIG. 7). To ensure that gear teeth 14 of input hub 12 stay engaged with gear teeth 32 of first sleeve gear 30, bump stops 58a and 58b are concentrically arranged within first sleeve gear 30 at the sides of gear teeth 32 (shown in FIG. 7). In a preferred embodiment, gear teeth 12, 24, 32, and 38 are substantially similar to spur gears which allow axial, angular, and radial displacement of input hub 12 and output hub 22 while having input hub 12 engaged with first sleeve gear 30 and output hub 22 engaged with second sleeve gear 36. It should be appreciated, however, that the use of different gear configurations is possible and considered to be within the scope of the invention as claimed. For example, a planetary gear could be used to transmit torque from input hub 12 to first sleeve gear 30 but a spur gear can be used to transmit torque from second sleeve gear 36 to output hub 22.

Figure 7:
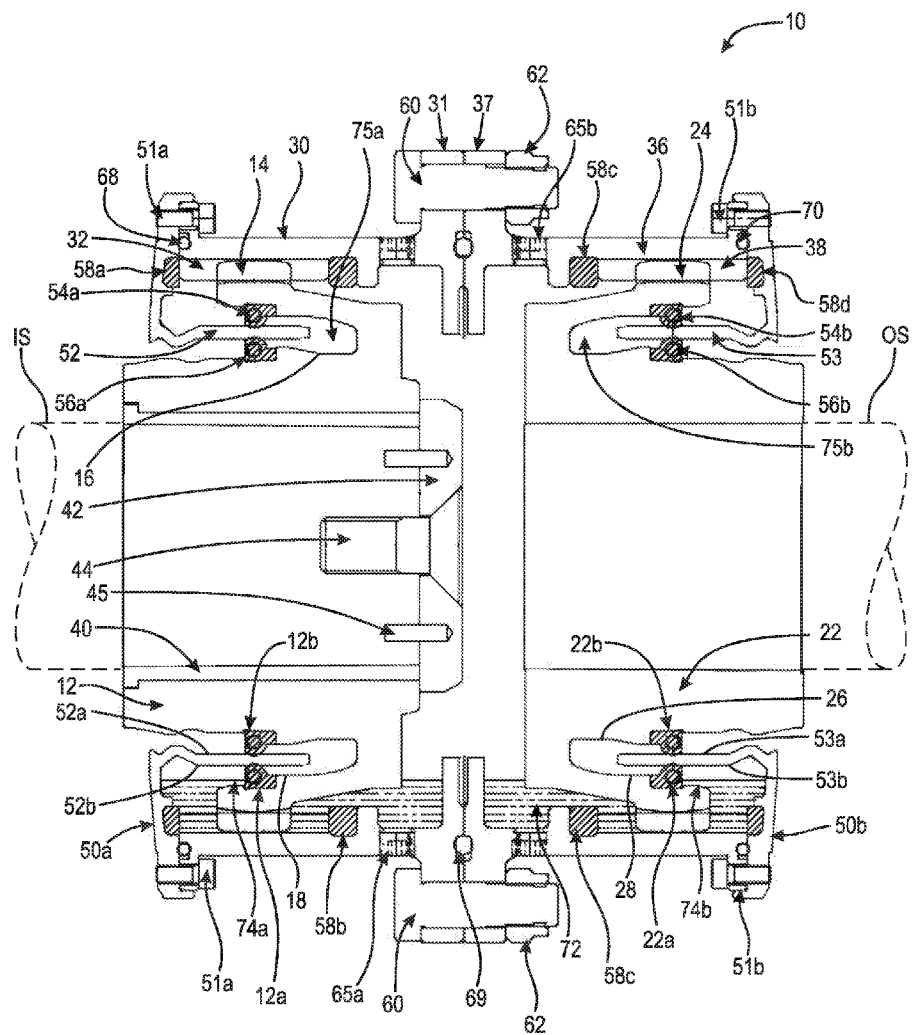

FIG. 7 is a cross section of gear coupling 10 taken generally along line 7-7 in FIG. 2. As shown in the figure, first end plate 50a comprises extension 52, surface 52a, and surface 52b and second end plate 50b comprises extension 53, surface 53a, and surface 53b. Retaining seal 54a is arranged between extension 52 and input hub 12 along surface 52b of extension 52 and surface 18 of input hub 12. Additionally, retaining seal 54b is arranged between extension 53 and output hub 22 along surface 52b of extension 52 and surface 18 of input hub 12. Lubricant 72 is arranged between gear teeth 14 of input hub 12 and gear teeth 32 of first sleeve gear 30 as well as between gear teeth 24 of output hub 22 and gear teeth 38 of second sleeve gear 36 to reduce friction during misalignment. Input hub 12 and output hub 22 have raised edges 74a and 74b, respectively, to mitigate lubricant 72 from approaching retaining seals 54a and 54b while gear coupling 10 is in operation. To prevent contamination of lubricant 72, excluding seal 56a is arranged between extension 52 and input hub 12 along surface 52a of extension 52 and surface 16 of input hub 12. Additionally, excluding seal 56b is arranged between extension 53 and output hub 22 along surface 53a of extension 53 and surface 26 of output hub 22. In a preferred embodiment, retaining seals 54a and 54b and excluding seals 56a and 56b are rubber lip seals. It should be appreciated, however, that the use of different materials for the seals is possible and considered to be within the scope of the invention as claimed. Additionally, seals 54a and 56a are arranged within recesses 12a and 12b of input hub 12, respectively, while seals 54b and 56b are arranged within recesses 22a and 22b of output hub 22, respectively. Channel 75a is formed between input hub 12 and extension 52 and allows for axial, radial, and angular movement of input hub 12 with relation to first sleeve gear 30. Channel 75b is formed between output hub 22 and extension 53 and allows for the axial movement of output hub 22 with relation to second sleeve gear 36. Channel 75a and 75b also aid in preventing contamination of lubricant 72 if excluding seals 56a or 56b begin to fail and stop preventing substances from migrating towards retaining seals 54a and 54b. The design of channels 75a and 75b pull contaminants away from retaining seals 54a and 54b while gear coupling 10 is in operation.

To ensure lubricant 72 is retained within gear coupling 10, besides the use of retaining seals 54a and 54b, static seal 68 is operatively arranged between first end plate 50a and first sleeve gear 30 and static seal 70 is operatively arranged between second end plate 50b and second sleeve gear 36. Additionally, static seal 69 is arranged between first sleeve gear 30 and second sleeve gear 36 in order to achieve a tight seal which lubricant 72 cannot pass through since the bolted connection between first sleeve gear 30 and second sleeve gear 36 is not sufficient to keep lubricant 72 within gear coupling 10. In a preferred embodiment, lubricant 72 is a fluid such as oil, which allows for lubricant 72 to not only have superior friction reducing capabilities, but also allows for the removal and replacement of lubricant 72 within gear coupling 10 by simply removing drain plugs 65a and 65b. It should be appreciated, however, that the use of different friction reducing substances is possible and considered to be within the scope of the invention as claimed. For example, a grease could be used within gear coupling 10.

It will be appreciated that various features of the above-described invention and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMBERS 10 gear coupling
12 input hub
14 gear teeth
16 first surface
18 second surface
22 output hub
24 gear teeth
26 first surface
28 second surface
30 first sleeve gear
31 flange
32 gear teeth
33 exterior surface
36 second sleeve gear
37 flange
38 gear teeth
39 exterior surface
40 sleeve
42 retaining plate
44 retaining plate fastener
45 pin
50a first end plate
50b second end plate
51a retaining screw
51b retaining screw
52 extension
52a first surface
52b second surface
53 extension
53a first surface
53b second surface
54a retaining seal
54b retaining seal
56a excluding seal
56b excluding seal
58a bump stop
58b bump stop 58c bump stop
58d bump stop
60 bolt
62 nut
65a drain plug
65b drain plug
68 static seal
69 static seal
70 static seal
72 lubricant
74a raised edge
74b raised edge
75a channel
75b channel
80 axis

What is claimed is:

1. A lubricated gear coupling for transmitting torque, comprising:
   a first hub operatively arranged to be connectable to an input shaft, said first hub comprising at least one gear tooth;
   a second hub operatively arranged to be connectable to an output shaft, said second hub comprising at least one gear tooth;
   a sleeve gear comprising at least one gear tooth, wherein said first hub and said second hub are arranged within said sleeve gear, said gear tooth of said first hub and said second hub corresponding with said gear tooth of said sleeve gear, wherein torque is transmitted from said input shaft to said output shaft with axial, radial, and angular movement occurring between said first hub and said second hub;
   a first bump stop arranged within said sleeve gear and operatively arranged to interact with said gear tooth of said first hub, said first bump stop arranged to prevent longitudinal sliding of said first hub in a predetermined amount in a first direction;
   a second bump stop arranged within said sleeve gear and operatively arranged to interact with said gear tooth of said first hub, said second bump stop arranged to prevent longitudinal sliding of said first hub in a predetermined amount in a second direction, said second direction opposite said first direction;
   a third bump stop arranged within said sleeve gear and operatively arranged to interact with said gear tooth of said second hub, said third bump stop arranged to prevent longitudinal sliding of said second hub in a predetermined amount in said first direction;
   a fourth bump stop arranged within said sleeve gear and operatively arranged to interact with said gear tooth of said second hub, said fourth bump stop arranged to prevent longitudinal sliding of said second hub in a predetermined amount in said second direction; and,
   a draining means arranged on said sleeve gear, wherein said lubricant can flow through.

2. The lubricated gear coupling recited in claim 1, wherein said lubricated gear coupling further comprises a first, second, third, and fourth seals.

3. The lubricated gear coupling recited in claim 2, wherein said first seal and said second seal are operatively arranged between said first hub and said sleeve gear.

4. The lubricated gear coupling recited in claim 3, wherein said first seal prevents discharge of said lubricant.

5. The lubricated gear coupling recited in claim 3, wherein said second seal prevents contamination of said lubricant.

6. The lubricated gear coupling recited in claim 2, wherein said third seal and said fourth seal are operatively arranged between said second hub and said sleeve gear.

7. The lubricated gear coupling recited in claim 6, wherein said third seal prevents discharge of said lubricant.

8. The lubricated gear coupling recited in claim 6, wherein said fourth seal prevents contamination of said lubricant.

9. The lubricated gear coupling recited in claim 1, wherein said sleeve gear comprises two cylindrical sections.

10. The lubricated gear coupling recited in claim 1, wherein said first hub is non-rotatably connected to said input shaft.

11. The lubricated gear coupling recited in claim 1 further comprising a sleeve.

12. The lubricated gear coupling recited in claim 11, wherein said input shaft is operatively arranged to be connectable with said first hub via said sleeve.

13. The lubricated gear coupling recited in claim 12, wherein said first hub is operatively arranged to be substantially non-rotatably connectable to said input shaft.

14. A lubricated gear coupling for transmitting torque between an input shaft and an output shaft, comprising:
   a first hub connected to said input shaft, said first hub comprising at least one gear tooth, a first raised edge, a first sealing surface, and a second sealing surface;
   a second hub non-rotatably connected to said output shaft, said second hub comprising at least one gear tooth, a second raised edge, a first sealing surface, and a second sealing surface;
   a sleeve gear comprising at least one gear tooth, a first sealing surface, a second sealing surface, a third sealing surface, and a fourth sealing surface, wherein said first hub and said second hub are arranged within said sleeve gear, said gear tooth of said first hub and said second hub corresponding with said gear tooth of said sleeve gear, wherein torque is transmitted from said input shaft to said output shaft with axial, radial, and angular movement occurring between said first hub and said second hub;
   a first seal adjacent to said first raised edge operatively arranged on said first sealing surface of said sleeve gear and said first sealing surface of said first hub;
   a second seal operatively arranged on said second sealing surface of said sleeve gear and said second sealing surface of said first hub;
   a third seal adjacent to said second raised edge operatively arranged on said third sealing surface of said sleeve gear and said first sealing surface of said second hub;
   a fourth seal operatively arranged on said forth sealing surface of said sleeve gear and said second sealing surface of said second hub;
   a first bump stop arranged radially outward of said first and second seals, said first bump stop arranged to prevent longitudinal sliding of said first hub in a predetermined amount in a first direction;
   a second bump stop arranged radially outward of said first and second seals, said second bump stop arranged to prevent longitudinal sliding of said first hub in a predetermined amount in a second direction, said second direction opposite said first direction;
   a third bump stop arranged radially outward of said third and fourth seals, said third bump stop arranged to prevent longitudinal sliding of said second hub in a predetermined amount in said first direction; and,
   a fourth bump arranged radially outward of said third and fourth seals, said fourth bump stop arranged stop to prevent longitudinal sliding of said second hub in a predetermined amount in said second direction.

15. The lubricated gear coupling recited in claim 14, wherein said lubricated gear coupling further comprises a draining means arranged on said sleeve gear, wherein said lubricant can flow through.

16. The lubricated gear coupling recited in claim 14, wherein a first raised edge and a second raised edge operatively arranged on said first hub and said second hub, respectively, prevent said lubricant from approaching said first seal and said third seal.

17. The lubricated gear coupling recited in claim 14, wherein said first, second, third, and fourth seals are lip seals.

18. The lubricated gear coupling recited in claim 14, wherein said lubricant is oil.

19. The lubricated gear coupling recited in claim 14, wherein said first hub is operatively arranged to be non-rotatably connectable_to said input shaft.

20. The lubricated gear coupling recited in claim 14 further comprising a sleeve.

21. The lubricated gear coupling recited in claim 20, wherein said input shaft is operatively arranged to be connectable with said first hub via said sleeve.

22. The lubricated gear coupling recited in claim 21, wherein said first hub is operatively arranged to be substantially non-rotatably connectable to said input shaft.

23. A lubricated gear coupling for transmitting torque between an input shaft and an output shaft, comprising:
   a first hub connected to said input shaft, said first hub comprising at least one gear tooth, a first recess, a second recess, and a first raised edge;
   a first seal secured within said first recess of said first hub;
   a second seal secured within said second recess of said first hub;
   a second hub non-rotatably connected to said output shaft, said second hub comprising at least one gear tooth and a second raised edge;
   a third seal secured within said first recess of said second hub;
   a fourth seal secured within said second recess of said second hub;
   a sleeve gear comprising at least one gear tooth, wherein said first hub and said second hub are arranged within said sleeve gear, said gear tooth of said first hub and said second hub corresponding with said gear tooth of said sleeve gear, wherein torque is transmitted from said input shaft to said output shaft with axial, radial, and angular movement occurring between said first hub and said second hub;
   a first bump stop arranged radially outward of said first and second seals, said first bump stop arranged to prevent longitudinal sliding of said first hub in a predetermined amount in a first direction;
   a second bump stop arranged radially outward of said third and fourth seals, said second bump stop arranged to prevent longitudinal sliding of said second hub in a predetermined amount in a second direction; and,
   a draining means arranged on said sleeve gear, wherein said lubricant can flow through.

24. The lubricated gear coupling recited in claim 23, wherein said draining means is a removable cap.

25. The lubricated gear coupling recited in claim 23, wherein said first bump stop and said second bump stop are rubber seals.

26. The lubricated gear coupling recited in claim 23, wherein said first hub is connected to said input shaft by an interference fit.

27. The lubricated gear coupling recited in claim 23, wherein said second hub is connected to said output shaft by an interference fit.

28. The lubricated gear coupling recited in claim 23, wherein said at least one gear tooth of said first hub, said second hub, and said sleeve gear is a spur gear.

29. The lubricated gear coupling recited in claim 28, wherein said spur gear comprises a spherical crown at the outer diameter of said spur gear and an axially tapered flank.

30. The lubricated gear coupling recited in claim 23, wherein said first hub is operatively arranged to be non-rotatably connectable to said input shaft.

31. The lubricated gear coupling recited in claim 23 further comprising a sleeve.

32. The lubricated gear coupling recited in claim 31, wherein said input shaft is operatively arranged to be connectable with said first hub via said sleeve.

33. The lubricated gear coupling recited in claim 32, wherein said first hub is operatively arranged to be substantially non-rotatably connectable to said input shaft.

34. The lubricated gear coupling recited in claim 23, wherein said lubricant is oil.

35. The lubricated gear coupling recited in claim 23, wherein said lubricant is grease.

\* \* \* \* \*